United States Patent [19]
Moon

[11] Patent Number: 5,867,138
[45] Date of Patent: *Feb. 2, 1999

[54] DEVICE FOR DRIVING A THIN FILM TRANSISTOR LIQUID CRYSTAL DISPLAY

[75] Inventor: Seung-hwan Moon, Seoul, Rep. of Korea

[73] Assignee: Samsung Electronics Co., Ltd., Kyungki-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 614,718

[22] Filed: Mar. 13, 1996

[30] Foreign Application Priority Data

Mar. 13, 1995 [KR] Rep. of Korea ............... 1995 5129

[51] Int. Cl.$^6$ ................................................ G09G 3/36
[52] U.S. Cl. ........................................ 345/92; 345/96
[58] Field of Search ................. 345/90, 92, 96, 345/209, 211, 212; 327/535, 536, 537

[56] References Cited

U.S. PATENT DOCUMENTS

| | | | |
|---|---|---|---|
| 4,307,333 | 12/1981 | Hargrove | 327/535 |
| 4,970,409 | 11/1990 | Wada et al. | 307/296.1 |
| 5,521,871 | 5/1996 | Choi | 327/536 |
| 5,539,351 | 7/1996 | Gilsdorf et al. | 327/537 |
| 5,589,697 | 12/1996 | Smayling et al. | 327/537 |

*Primary Examiner*—Matthew Luu
*Attorney, Agent, or Firm*—Cushman Darby & Cushman IP Group of Pillsbury Madison & Sutro LLP

[57] ABSTRACT

A device for turning on a thin film transistor liquid crystal display includes a first switching circuit for generating and outputting an inverse common voltage signal in response to a switching signal, a second switching circuit for generating and outputting a common voltage signal in response to an inverse switching signal and a level shift circuit for generating and outputting a potential capable of turning on a thin film transistor by using the inverse common voltage signal and the common voltage signal. The switches preferably are implemented with PMOS and NMOS transistors. This device can reduce power consumption by eliminating the analog switch, the operational amplifier and the push-pull circuit. A similar device for turning off a thin film transistor liquid display is also disclosed.

17 Claims, 5 Drawing Sheets

DEVICE FOR DRIVING A THIN FILM TRANSISTOR LIQUID CRYSTAL DISPLAY

BACKGROUND OF THE INVENTION

1. Field of the Invention

The present invention relates to a device for driving a thin film transistor liquid crystal display (TFT-LCD), which more specifically can reduce power consumption by eliminating large power consumption elements such as analog switches, operational amplifiers and a push-pull circuits.

2. Description of the Related Art

In order to continue the current trend toward light weight and compact electronic products, research and development in liquid crystal displays (LCDs) as replacements to cathode ray tubes (CRT) has been undertaken.

LCDs or flat-panel displays provide many advantages, including light weight and thin volume. A further and more significant advantage is that LCDs permit adapting an LSI driver because LCDs can be driven by low voltage and power. For these reasons, most manufacturers have invested in technical development and practical use of LCDs.

A TFT-LCD is a LCD which combines each pixel with a thin film transistor. These transistors are constructed in such a way that amorphous silicon is applied to a glass substrate by thin film techniques, and a twisted nematic liquid crystal is used as a liquid crystal material.

TFT-LCDs are advantageous in that no crosstalk is generated, because only one pixel can be turned on when receiving a signal from the transistor. It is also advantageous in that the entire display can be maintained during a non-selection time because each pixel has a thin film capacitor which stores voltage.

A typical TFT-LCD is shown in FIGS. 1 to 5, and is discussed in greater detail below.

FIG. 1 shows a pixel circuit diagram of a conventional gate type TFT-LCD. As shown in FIG. 1, a conventional pixel circuit includes a switching transistor TFT, a liquid crystal Clc connected between the drain terminal of the switching transistor TFT and a common electrode, and a capacitor Cst connected between the drain terminal of the switching transistor TFT and a gate terminal of another switching transistor TFT.

The main feature of this circuit is that one electrode of the capacitor Cst is connected to a gate terminal of another switching transistor TFT.

To drive this circuit, an AC common driving method is commonly used. In this method, a common voltage signal Vcom having an AC waveform is applied to the common electrode connected to the liquid crystal Clc, and gate-on/-off voltage signals Von/Voff for periodically turning-on/-off the switching transistor TFT are applied to the gate terminal of the switching transistor TFT.

In this case, the common voltage signal Vcom should be in the same phase as that of the gate-on voltage signal and the gate-off voltage signal for at least two reasons.

First, the capacitor Cst and the liquid crystal Clc are connected to the common voltage signal Vcom and the gate-on voltage signal Voff. Here, if the common voltage signal does not have the same voltage and amplitude as those of the gate-off voltage signal Voff, the potential difference between Von and Voff, varying upon the time, leads to leakage current from the capacitor Cst and the liquid crystal Clc. This increases power consumption, while showing unstable display characteristics.

Second, in an LCD, a kick back voltage should be maintained uniformly. As the kick back voltage is proportional to Von−|Voff|, Von−|Voff|should be maintained uniformly. However, if the kick back voltage is not uniform, abnormal display characteristics may be generated.

A circuit such as the one shown in FIG. 2 is typically used in conventional devices to generate the gate-on voltage signal Von. This circuit will now be described.

FIG. 2, is a detailed circuit diagram of a gate-on voltage generator employed in a conventional TFT-LCD. As illustrated in FIG. 2, a gate-on voltage generator includes an analog switching circuit AS having input terminals connected to a pair of switching signal lines POL, /POL, a pair of gate-on voltage signal lines Von1, Von2, and an input power voltage VEE. A non-inverting input terminal of an operational amplifier is connected to an output terminal of the analog switching circuit AS and an input terminal of a push-pull circuit is connected to an output terminal of the operational amplifier.

In the gate-on voltage generator, when a switching signal POL or /POL is applied to the analog switching circuit AS, the analog switching circuit AS alternately outputs the gate-on voltage signal corresponding to Von1 in the high state or Von2 in the low state.

The output signal from the analog switching circuit AS is applied to the operational amplifier and the push-pull circuit in order to divide the impedance, before outputting the gate-on voltage signal Von, independent of the load conditions, as illustrated in FIG. 3. In this case, Von1−Von2 should be equal to Vcom1−Vcom2 to uniformly maintain the kick back voltage.

Further, to output the gate-on voltage signal Von1 in high state, power voltage VEE should satisfy the following condition:

$$VEE > Von1 + V_{BE} + Vos$$

where, $V_{BE}$ is an amount of lowered voltage at the push-pull circuit, and Vos is an offset voltage between a power voltage VEE and a maximum possible output voltage of the operational amplifier. In a typical TFT-LCD, the power voltage VEE is generated from a DC/DC converter.

However, this conventional gate-on generator of a TFT-LCD driving circuit has several problems. First, it is difficult to adjust the levels of the gate-on voltage signals Von1, Von2 to equalize with the amplitude of the common voltage signal Vcom. A more serious problem is that adjustment of the gate-on voltage signals Von1 and Von2 is required since each component of the TFT-LCD module may have a tolerance and, therefore, each module has a slightly different common voltage Vcom. This troublesome adjustment lowers the productivity during manufacturing.

Second, the power voltage VEE should be a considerably high voltage, typically above +20V, and total power consumption of the TFT-LCD is too large due to the analog switch AS, the operational amplifier, and the push-pull circuit.

Third, a DC/DC converter is required to generate the power voltage VEE, thereby increasing the production cost.

A conventional gate-off voltage generator for use in a TFT-LCD will now be described with reference to FIG. 4. As illustrated in FIG. 4, a conventional gate-off voltage generator includes an analog switching circuit AS having input terminals connected to a pair of switching signal line POL, /POL, a pair of gate-off voltage signal lines Voff1, Voff2, and a power voltage VSS. A non-inverting input terminal of an operational amplifier is connected to an output terminal of the analog switching circuit AS, and a push-pull circuit having its input terminal connected to an output of the operational amplifier.

Operation of this conventional gate-off voltage generator will now be described.

When the switching signal POL or /POL is applied to the analog switching circuit AS, the analog switching circuit AS alternately outputs a signal corresponding to the gate-off voltage signal Voff1 in high state or Voff2 in low state.

The output signal from the analog switching circuit AS is applied to the operational amplifier and the push-pull circuit in order to divide the impedance, before outputting the gate-off voltage signal Voff, independent of the load conditions, as illustrated in FIG. 5.

In general, the gate-off voltage level is within the range of −7V to −2V, because the turn-off voltage level of the TFT-LCD is below −2V.

However, this conventional gate-off generator has several problems. First, it is difficult to adjust the levels of the gate-off voltage signals Voff1, Voff2. In more detail, the gate-off voltage signals Voff1 in the high state and Voff2 in the low state should be equal to the amplitude of the common voltage signal Vcom, and therefore the gate-off voltage signals Voff1 and Voff2 should be adjusted one by one in response to the amplitude of the common voltage signal Vcom, within a certain tolerance. This difficult adjustment lowers manufacturing productivity.

Second, power consumption is considerably large. To generate an electric potential of −7V which is a level of the gate-off voltage signal Voff, a power below −7V is required for the analog switch, the operational amplifier and the push-pull circuit, which must be obtained from the DC/DC convertor. Although low power consumption is a necessity in portable LCDs, the entire power consumption of the conventional gate-off voltage generator increases since the analog switch, operational amplifier and push-pull circuit consume a considerably large amount of power and the power conversion efficiency of the DC/DC convertor is below 70%.

SUMMARY OF THE INVENTION

In view of the above, it is an object of the present invention to provide a circuit for driving a TFT-LCD which can reduce power consumption by omitting large power consumption elements such as analog switches, operational amplifiers and a push-pull circuits.

To achieve the above-mentioned object and others, according to a preferred embodiment of the present invention, a device for turning on the TFT-LCD includes a first switching circuit for generating an inverse common voltage signal in response to a switching signal and a second switching circuit for generating a common voltage signal in response to an inverse switching signal. A first level shift circuit generates a potential which makes the TFT turn on using the inverse common voltage signal and the common voltage signal.

Further, to achieve the above-mentioned object, according to another preferred embodiment of the present invention, a device for turning off the TFT-LCD includes a third switching circuit for generating an inverse common voltage signal in response to a switching signal and a fourth switching circuit for generating a common voltage signal in response to an inverse switching signal. A second level shift circuit generates a potential which makes the TFT turn off using the inverse common voltage signal and the common voltage signal.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

Figure 1:
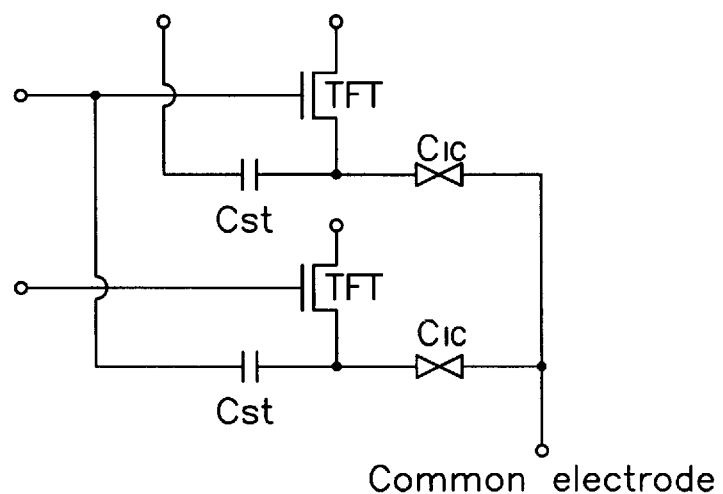
FIG. 1 is a pixel circuit diagram of a conventional gate type TFT-LCD.
Figure 2:
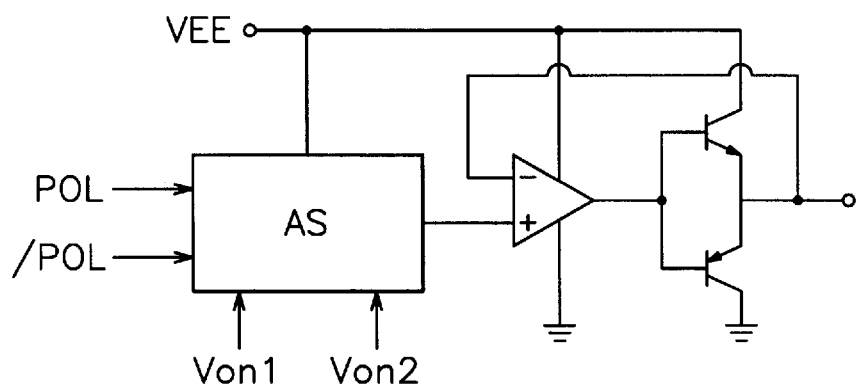
FIG. 2 is a detailed circuit diagram of a gate-on voltage generator employed in a typical conventional TFT-LCD.
Figure 3:
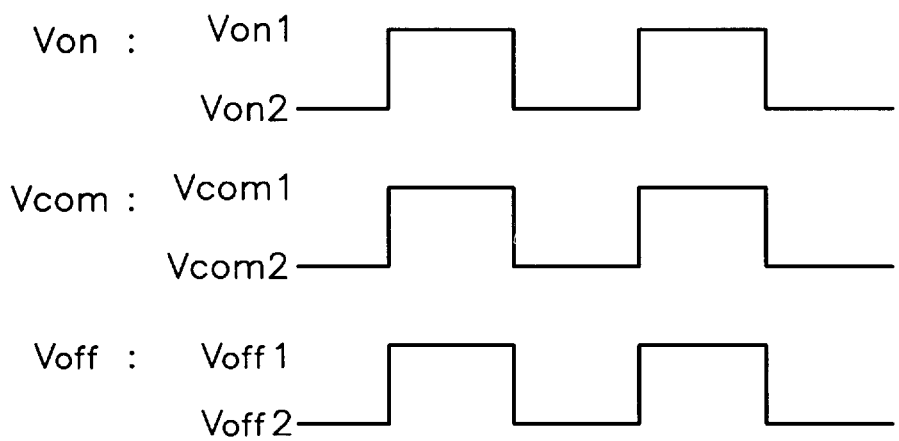
FIG. 3 is an illustration of waveforms of FIG. 2.
Figure 4:
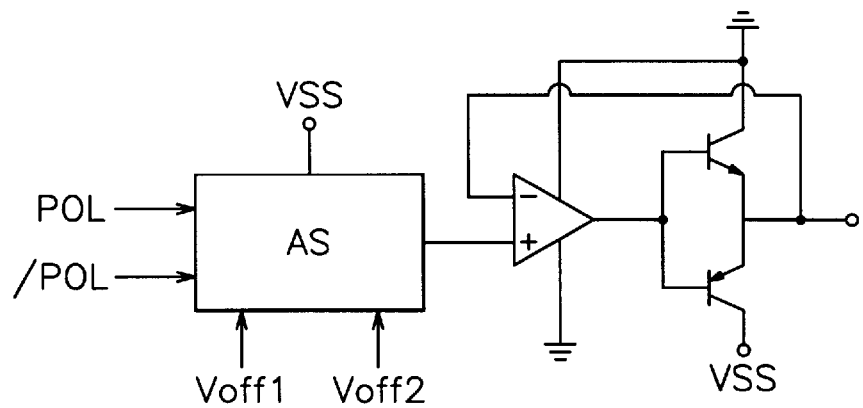
FIG. 4 is a detailed circuit diagram of a gate-off voltage generator employed in a typical conventional TFT-LCD.
Figure 5:
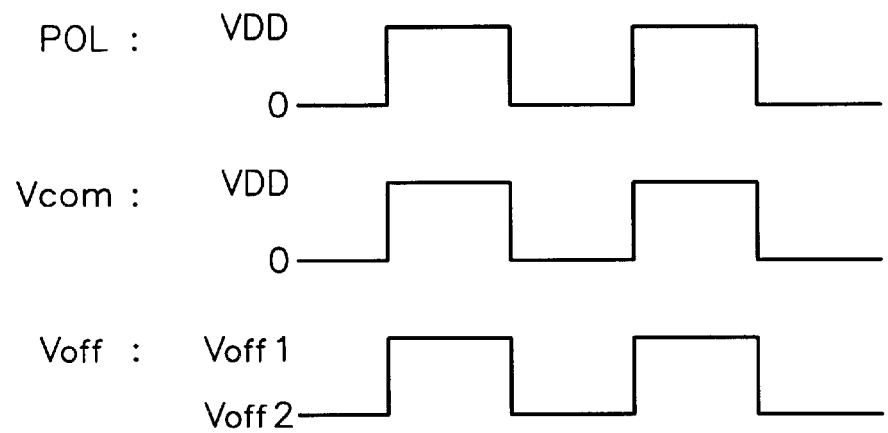
FIG. 5 is an illustration of waveforms of FIG. 4.
Figure 6:
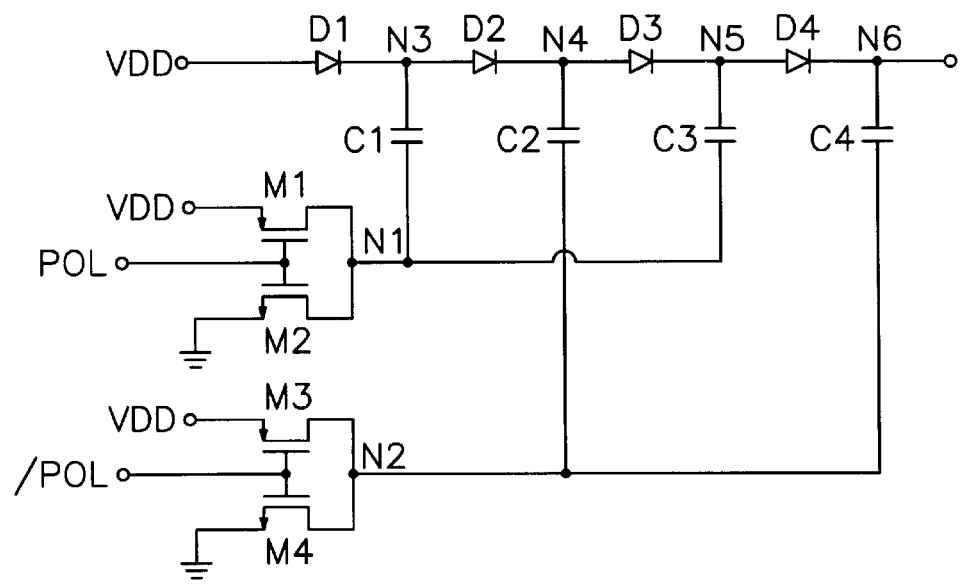
FIG. 6 is a detailed circuit diagram of a gate-on voltage generator according to a preferred embodiment of the TFT-LCD of this invention.
Figure 7:
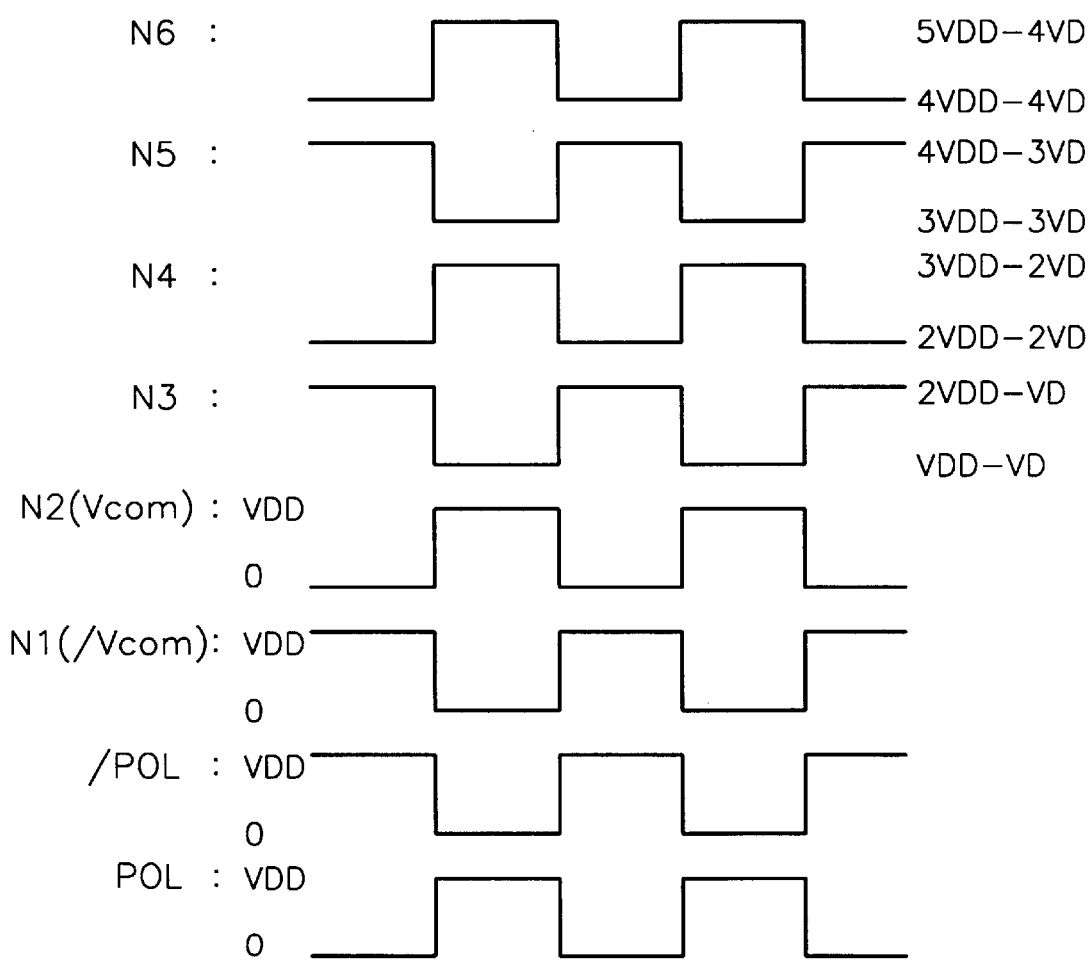
FIG. 7 is an illustration of waveforms of FIG. 6.

A preferred embodiment of the present invention will now be described with reference to FIGS. 6–9. FIG. 6 is a detailed circuit diagram of a gate-on voltage generator employed in a TFT-LCD of the present invention, and FIG. 7 is an illustration of the main waveforms of FIG. 6.

As shown in FIG. 6, in a device for driving a TFT-LCD, a gate-on voltage generator includes a first transistor M1 having its source terminal connected to a power voltage VDD, and its gate terminal connected to a switching signal line POL, a second transistor M2 having its source terminal connected to ground and its gate terminal connected to the switching signal line POL, a third transistor M3 having its source terminal connected to power voltage VDD and its gate terminal connected to an inverse switching signal line /POL, and a fourth transistor M4 having its source terminal connected to ground and its gate terminal connected to the inverse switching signal line /POL.

Four diodes D1 to D4 are connected with each other in series from a power voltage VDD. A capacitor C1 is connected between a connection node N1 of the transistors M1 and M2 and a connection node N3 of the diode D1 and D2. A capacitor C3 is connected between a connection node N1 of the transistors M1 and M2 and a connection node N5 of the diode D3 and D4. A capacitor C2 is connected between a connection node N1 of the transistors M3 and M2 and a connection node N4 of the diode D2 and D3. And, a capacitor C4 is connected between a connection node N2 of the transistors M3 and M4 and a cathode of the diode D4.

Operation of this gate-on voltage generator begins with the application of the power voltage VDD. Next, the first and second transistors M1 and M2 output an inverse common voltage signal /Vcom in response to a switching signal POL, and the third and fourth transistors M3 and M4 output a common voltage signal Vcom in response to an inverse switching signal /POL.

This operation will now be discussed with reference to FIG. 7. When the switching signal POL is at the VDD level, the second transistor M2 is turned on and the node N1 outputs zero voltage 0V, whereas when the switching signal POL is at zero level, the first transistor M1 is turned on and the node N1 outputs VDD level voltage. That is, the inverse common voltage waveform /Vcom as shown in FIG. 7 is output at the node N1.

Next, when the inverse switching signal /POL is at zero level, the third transistor M3 is turned on and the node N2 outputs VDD level voltage, whereas when the inverse switching signal /POL is at VDD level, the fourth transistor M4 is turned on and the node N2 outputs zero voltage. That is, the common voltage waveform Vcom as shown in FIG. 7 is output at the node N2.

These waveforms Vcom and /Vcom are output to the level shift circuit including the serially connected diodes D1 to D4 and the capacitors C1 to C4, so that the voltage rises up to a level which allows the thin film transistor to turn on.

A detailed explanation of this operation follows. First, with reference to node N3, when the inverse common voltage signal /Vcom of the node N1 is at zero level, the voltage VDD−VD which is lowered as much as the diode voltage VD from the power voltage VDD is applied to the capacitor C1, so that an electric charge Q1 as much as C1 * (VDD−VD) is stored in the capacitor C1.

In this state, when the inverse common voltage signal /Vcom of the node N1 is at level VDD, the node N3 has the following voltage:

$$VDD + \frac{Q1}{C1} = VDD + \frac{C1 * (VDD - VD)}{C1} = 2VDD - VD$$

where, VD denotes the drop diode voltage. Consequently, the node N3 outputs the waveform as shown in FIG. 7.

Next, with respect to node N4, when the common voltage signal Vcom of the node N2 is at zero level, the voltage 2VDD−2VD which is lowered as much as the diode voltage VD from the voltage 2VDD−VD of the node N3 is applied to capacitor C2, so that an electric charge Q2 as much as C2 * (2VDD−2VD) is stored in the capacitor C2.

In this state, when the common voltage signal Vcom of the node N2 is at VDD level, the node N4 has the following voltage:

$$VDD + \frac{Q2}{C2} = VDD + \frac{C2 * (2VDD - 2VD)}{C2} = 3VDD - 2VD$$

Consequently, the node N3 outputs the waveform as shown in FIG. 7.

With respect to node N5, when the inverse common voltage signal /Vcom of the node N1 is at the zero level, the voltage 3VDD−3VD which is lowered as much as the diode voltage VD from the voltage 3VDD−2VD is applied to the capacitor C3, so that an electric charge Q3 as much as C3 * (3VDD−3VD) is stored in the capacitor C3.

In this state, when the inverse common voltage signal /Vcom of the node N1 is at VDD level, the node N5 has the following voltage:

$$VDD + \frac{Q3}{C3} = VDD + \frac{C3 * (3VDD - 3VD)}{C3} = 4VDD - 3VD$$

Consequently, the node N5 outputs the waveform as shown in FIG. 7.

With respect to node N6, when the common voltage signal Vcom of the node N2 is at zero level, the voltage 4VDD−4VD which is lowered as much as the diode voltage VD from the voltage 4VDD−3VD is applied to the capacitor C4, so that an electric charge Q4 as much as C4 * (4VDD−4VD) is stored in the capacitor C4.

In this state, when the common voltage signal Vcom of the node N2 is at VDD level, the node N6 has the following voltage:

$$VDD + \frac{Q4}{C4} = VDD + \frac{C4 * (4VDD - 4VD)}{C4} = 5VDD - 4VD$$

Consequently, the node N6 outputs the waveform as shown in FIG. 7. That is, a square wave is output from the node N6, running between 4VDD−4VD and 5VDD−4VD repeatedly, while having the same phase and amplitude as the common voltage signal Vcom.

When the power voltage VDD is 5V and the diode voltage VD is 0.6V, the voltage of the node N6 runs between 17.6v and 22.6V repeatedly. This potential is enough to make the TFT turn on.

Accordingly, in a device for driving the TFT-LCD, the gate-on voltage generator has several distinct advantages. First, mass production is possible because the gate-on voltage signal V6 has the same phase and amplitude as that of common voltage signal Vcom, without additional adjustment. Second, stability in picture can be obtained because of the uniform kickback voltage. Third, low power consumption is available for the LCD because little power is consumed in generating the gate-on voltage signal Von. And, fourth, production cost is lowered as a DC/DC converter is not required.

Figure 8:
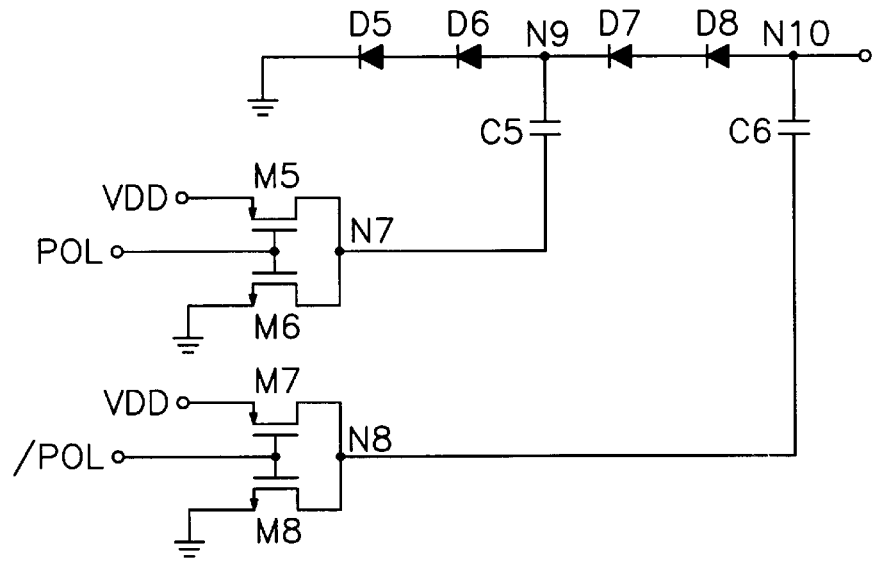
FIG. 8 is a detailed circuit diagram of a gate-off voltage generator according to a preferred embodiment of the TFT-LCD of this invention.
Figure 9:
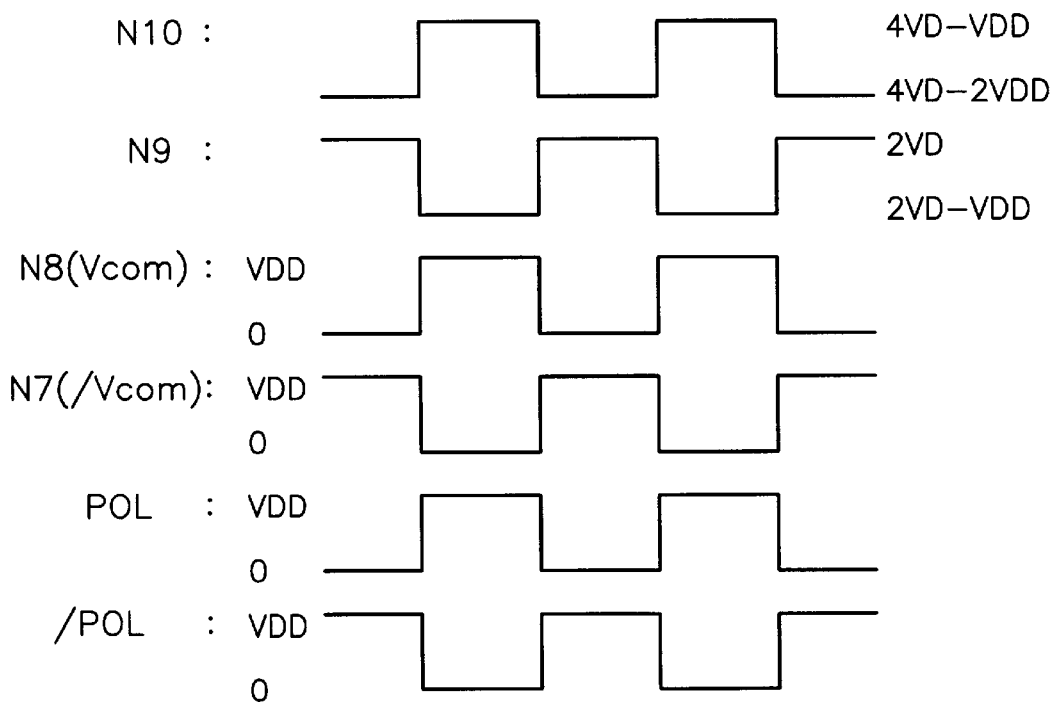
FIG. 9 is an illustration of waveforms of FIG. 8.

FIG. 8 is a detailed circuit diagram of a gate-off voltage generator employed in a TFT-LCD of a preferred embodiment of this invention, and FIG. 9 illustrates the main waveforms at various points in the circuit of FIG. 8.

As shown in FIG. 8, in a device for driving a TFT-LCD, a gate-off voltage generator includes a fifth transistor M5 having its source terminal connected to a power voltage VDD, and its gate terminal connected to a switching signal line POL, a sixth transistor M6 having its source terminal connected to ground and its gate terminal connected to the switching signal line POL, a seventh transistor M7 having its source terminal connected to a power voltage VDD and its gate terminal connected to an inverse switching signal line /POL, and an eighth transistor M8 having its source terminal connected to ground and its gate terminal connected to the inverse switching signal line POL.

Four diodes D5 to D8 are serially connected with each other in the reverse direction to ground. A capacitor C5 is connected between a connection node N7 of the transistors M5 and M6 and a connection node N9 of the diode D6 and D7, and a capacitor C6 is connected between a connection node N8 of the transistors M7 and M8 and a connection node N10 of an anode of the diode D8.

The operation of the gate-off voltage generator begins with application of the power voltage VDD. Next, the fifth and sixth transistors M5 and M6 output an inverse common voltage signal /Vcom in response to a switching signal POL, and the seventh and eighth transistors M7 and M8 output a common voltage signal Vcom in response to an inverse switching signal /POL.

This operation is discussed below with reference to FIG. 9. When the switching signal POL is at the VDD level, the sixth transistor M6 is turned on and the node N7 outputs zero voltage 0V, whereas when the switching signal POL is at zero level, the fifth transistor M5 is turned on and the node N7 outputs VDD level voltage. That is, the inverse common voltage waveform /Vcom as shown in FIG. 9 is output at the node N1.

Next, when the inverse switching signal /POL is at zero level, the seventh transistor M7 is turned on and the node N8 outputs VDD level voltage, whereas when the inverse switching signal /POL is at VDD level, the eighth transistor M8 is turned on and the node N8 outputs zero voltage. That is, the common voltage waveform Vcom as shown in FIG. 9 is output at the node 8.

These waveforms Vcom and /Vcom are output to the level shift circuit including the diodes D5 to D8 and the capacitors C5 and C6, so that the voltage is lowered to a level which allows the thin film transistor to turn off, successively.

A more detailed explanation of this operation will now be described. First, with respect to node N9, when the inverse common voltage signal /Vcom of the node N7 is at VDD, the voltage 2VD−VDD which is lowered as much as the power voltage VDD from the diode voltage 2VD is applied to the capacitor C5, so that an electric charge Q5 as much as C5 * (2VD−VDD) is stored in the capacitor C5.

In this state, when the inverse common voltage signal /Vcom of the node N7 is at zero level, the node N9 has the following voltage:

$$0V + \frac{Q5}{C5} = 0V + \frac{C5 * (2VD - VDD)}{C5} = 2VD - VDD$$

where, VD denotes the lower voltage at the diode. Consequently, the node N9 outputs the waveform as shown in FIG. 9.

Next, with respect to node N10, when the common voltage signal Vcom of the node N8 is at VDD level, the voltage 4VD−2VDD which is lowered as much as the power voltage 2VDD from the diode voltage 4VD is applied to the capacitor C6, so that an electric charge Q6 as much as C6 * (4VD−2VDD) is stored in the capacitor C6.

In this state, when the common voltage signal Vcom of the node N8 is at zero level, the node N10 has the following voltage:

$$0V + \frac{Q6}{C6} = 0V + \frac{C6 * (4VD - 2VDD)}{C6} = 4VD - 2VDD$$

Consequently, the node N10 outputs the waveform as shown in FIG. 9. That is, a square wave is output from the node N10, running between 4VD−VDD and 4VD−2VDD repeatedly, while having the same phase and amplitude as the common voltage signal Vcom.

When the power voltage VDD is 5V and the diode voltage VD is 0.75V, the voltage of the node N10 runs between −2V and −7V repeatedly. This potential is sufficient to make the TFT turn off.

Accordingly, a gate-off voltage generator for driving a TFT-LCD as described above has several distinct advantages. First, the gate-off voltage signal Voff has the same phase and amplitude as the common voltage signal Vcom, and hence additional voltage adjustment is not required, thus increasing productivity. Second, stability in picture can be obtained because of a breakage current resulting from the capacitances Cst and Clc can be minimized. Third, low power consumption is available for the LCD because minimal power is consumed in generating the gate-off voltage signal Voff. Fourth, production cost is lowered because a DC/DC converter is not required.

As mentioned above, this device can reduce power consumption by omitting the analog switch, the operational amplifier and the push-pull circuit. Hence, a low power consumption type LCD can be available.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A gate-on voltage generating circuit for turning on a thin film transistor of a thin film transistor liquid crystal display using an AC common voltage signal which is applied to a common electrode, comprising:

a first switching circuit for generating and outputting an inverse common voltage signal which is inverse of said common voltage signal in response to a first switching signal;

a second switching circuit for generating and outputting said common voltage signal in response to a second switching signal which is inverse said first switching signal; and a first level shift circuit for generating and outputting said gate-on voltage by using said inverse common voltage signal and said common voltage signal, said gate-on voltage having the same phase as said common voltage signal;

wherein said first level shift circuit includes serially connected diodes and a plurality of capacitors, each of said capacitors being connected between a cathode terminal of a respective one of said diode and one of said first and second switching circuits.

2. A circuit according to claim 1, wherein the first switching circuit includes an N-MOS transistor and a P-MOS transistor, and outputs a power voltage and zero voltage as said inverse common voltage signal in response to the first switching signal.

3. A circuit according to claim 1, wherein: the second switching circuit includes an N-MOS transistor and a P-MOS transistor, and outputs a power voltage and zero voltage as said common voltage signal in response to the second switching signal.

4. A circuit according to claim 1, wherein: the first level shift circuit includes four diodes and four capacitors.

5. A circuit according to claim 2, wherein: the first level shift circuit includes four diodes and four capacitors.

6. A circuit according to claim 3, wherein: the first level shift circuit includes four diodes and four capacitors.

7. A circuit according to claim 4, wherein: the first level shift circuit raises the voltage level of the voltage signals applied from the first switching circuit and the second switching circuit.

8. A gate-off voltage generating circuit for turning off a thin film transistor of a thin film transistor liquid crystal display using an AC common voltage signal which is applied to a common electrode, comprising:

a first switching circuit for generating and outputting an inverse common voltage signal which is inverse of said common voltage in response to a first switching signal;

a second switching circuit for generating and outputting said common voltage signal in response to a second switching signal which is inverse of said first switching signal; and a level shift circuit for generating and outputting said gate-off voltage by using said inverse common voltage signal and said common voltage signal, said gate-off voltage having the same phase as said common voltage signal;

wherein said level shift circuit includes serially connected diodes and a plurality of capacitors, each of said capacitors being connected between an anode terminal of one of said diodes and one of said first and second switching circuits.

9. A circuit according to claim 8, wherein:

the first switching circuit includes an N-MOS transistor and a P-MOS transistor, and outputs a power voltage and zero voltage as said inverse common voltage signal in response to the first switching signal.

10. A circuit according to claim 8, wherein:

the second switching circuit includes an N-MOS transistor and a P-MOS transistor, and outputs a power voltage and zero voltage as said common voltage signal in response to the second inverse switching signal.

11. A circuit according to claim 8, wherein:

the level shift circuit includes four diodes and two capacitors.

12. A circuit according to claim 9, wherein:

the level shift circuit includes four diodes and two capacitors.

13. A circuit according to claim 10, wherein:

the level shift circuit includes four diodes and two capacitors.

14. A circuit according to claim 11, wherein:

the level shift circuit lowers the voltage level of said voltage signals applied from the first switching circuit and the second switching circuit.

15. A circuit according to claim 11, wherein:

said four serially connected diodes are aligned in reverse direction to ground with the cathode of the first of said four serially connected diodes connected to ground;

one of said two capacitors is connected between the anode of the second of said four serially connected diodes and said first switching circuit; and the other of said two capacitors is connected between the anode of the fourth of said four serially connected diodes and the second switching circuit.

16. A circuit according to claim 12, wherein:

said four serially connected diodes are aligned in reverse direction to ground with the cathode of the first of said four serially connected diodes connected to ground;

one of said two capacitors is connected between the anode of the second of said four serially connected diodes and said first switching circuit; and the other of said two capacitors is connected between the anode of the fourth of said four serially connected diodes and the second switching circuit.

17. A circuit according to claim 13, wherein:

said four serially connected diodes are aligned in reverse direction to ground with the cathode of the first of said four serially connected diodes connected to ground;

one of said two capacitors is connected between the anode of the second of said four serially connected diodes and said first switching circuit; and the other of said two capacitors is connected between the anode of the fourth of said four serially connected diodes and the second switching circuit.

* * * * *